United States Patent [19]

Kitchenman

[11] Patent Number: 5,554,345
[45] Date of Patent: Sep. 10, 1996

[54] OZONE GENERATION APPARATUS AND METHOD

[75] Inventor: Oswald R. G. Kitchenman, Orewa, New Zealand

[73] Assignee: Novozone (N.V.) Limited, Glenfield, New Zealand

[21] Appl. No.: 416,705

[22] PCT Filed: Oct. 13, 1993

[86] PCT No.: PCT/NZ93/00097

§ 371 Date: Apr. 13, 1995

§ 102(e) Date: Apr. 13, 1995

[87] PCT Pub. No.: WO94/08891

PCT Pub. Date: Apr. 28, 1994

[30] Foreign Application Priority Data

Oct. 14, 1993 [NZ] New Zealand .................. 244729

[51] Int. Cl.$^6$ ...................................... B01J 19/08
[52] U.S. Cl. ............... 422/186.15; 422/907; 422/186.07; 204/176
[58] Field of Search ................. 422/186.07, 186.18, 422/907, 186.15; 204/176

[56] References Cited

U.S. PATENT DOCUMENTS

| | | | |
|---|---|---|---|
| 788,557 | 5/1905 | Sahlström | 422/186.07 |
| 935,457 | 9/1909 | Bridge | 422/186.07 |
| 2,113,913 | 4/1938 | Cragun | 204/32 |
| 2,128,455 | 1/1936 | Darling | 204/32 |
| 4,650,678 | 3/1987 | Beer et al. | 422/186.07 |
| 5,087,428 | 2/1992 | Fletcher et al. | 422/186.07 |
| 5,089,098 | 2/1992 | Tacchi | 204/176 |
| 5,348,709 | 9/1994 | Wheatley | 422/186.18 |

FOREIGN PATENT DOCUMENTS

| | | |
|---|---|---|
| 156930 | 8/1953 | Australia. |
| 93/16001 | 8/1993 | WIPO. |

OTHER PUBLICATIONS

Patent Abstracts of Japan, "Sumitomo Heavy Industries, Ltd.", Dec. 3, 1987, JP 62-278105.
Patent Abstracts of Japan, "Fuji Electric Co. Ltd.", Jan. 25, 1988, JP 63-17207.
Dimitriou, M. A., "Design Guidance Manual For Ozone Systems", Pan American Committee of The International Ozone Assn., 1990, pp. 57–65.

*Primary Examiner*—Charles T. Jordan
*Assistant Examiner*—Daniel Jenkins
*Attorney, Agent, or Firm*—Foley & Lardner

[57] ABSTRACT

An ozone generation apparatus has a first electrode, a solid dielectric material and a discharge gap region with a flow of the oxygen gas or oxygen bearing gas provided through the discharge gap region. A structure of electrically conductive material such a titanium or stainless steel is positioned within the gas flow to act as second electrode with points of the structure contacting a surface of the dielectric material to provide a variable discharge gap in between the points of contact. The points of contact preferably form a regular pattern.

20 Claims, 4 Drawing Sheets

OZONE GENERATION APPARATUS AND METHOD

BACKGROUND OF THE INVENTION

The present invention relates to the generation of ozone.

The production of ozone can be required for many purposes such as in water treatment, whether this be for swimming pools, drinking water, hydroponics, cooling towers or the like, air purification and metal removal for example. Ozone has a major benefit as a disinfectant in that it will kill bacteria, viruses, cysts, etc. without putting any toxic matter into the water.

Ozone is a relatively unstable gas, having the formula $O_3$ which will revert back to oxygen, $O_2$. Ozone is created naturally such as by electrical activity associated with lightning, power transmission lines, ultra violet light etc. but commercially is produced by short wave ultra violet tubes or by corona discharge apparatus, sometimes referred to as Siemens discharge cells.

The present invention relates to such corona discharge apparatus which will typically take the form of concentric tubes or parallel flat plates through which the oxygen or oxygen bearing gas will flow and across which a corona will be created to produce ozone.

The description hereinafter will, for simplicity only, refer to parallel flat plate type apparatus but it is to be understood that other configurations which will be apparent to those skilled in the electrical arts, such as concentric tube configurations, are incorporated herein.

A major disadvantage of existing corona cells is the high voltage that is required, typically not less than 5 KV at a frequency of 50 Hz (low frequency)—600 Hz (medium frequency)—2000 Hz (high frequency). The highest frequency which the applicant is aware of having been proposed to be used in a corona cell was 10 KHz. It will be appreciated that the use of high voltages carries with it inherent disadvantages both in the cost of providing the high voltage, the cost of insulating the equipment to accommodate the high voltage, and the inherent safety considerations for the users of the equipment.

It is thus an object of the present invention to provide an ozone generation method and apparatus which operates at or above substantially 20 KHz, hereinafter referred to as "high frequency (as herein defined)" which overcomes or at least obviates disadvantages in such methods and apparatus available at the present time or which at least will provide the public with a useful choice.

Further objects of this invention will become apparent from the following description.

SUMMARY OF THE INVENTION

According to one aspect of the present invention there is thus provided a method of generating ozone using high frequency (as herein defined) comprising:

i) Providing a first electrode, a solid dielectric material and a discharge gap region with said dielectric material provided between said first electrode and said discharge gap region;

ii) Providing, in use, a flow of oxygen gas or oxygen bearing gas through said discharge gap region;

iii) Providing a structure of electrically conductive material having a plurality of spaced apart contact points from each of which is inclined away a portion of said conductive material;

iv) Positioning said structure to act as a second electrode within said gas flow so that said plurality of contact points of said structure contact a surface of said dielectric material to divide it up into a plurality of areas defined by zero potential noted at said contact points and each said inclined portion provides a variable discharge gap with said dielectric material in between said points of contact; and v) Connecting a high frequency (as herein defined) electrical supply across said first and second electrodes.

According to a further aspect of the present invention there is provided an ozone generation apparatus which operates at a high frequency (as herein defined) comprising:

i) A first electrode;

ii) A solid dielectric material and a discharge gap region with said dielectric material provided between said first electrode and said discharge gap region;

iii) Supply means, in use, to provide a flow of oxygen gas or oxygen bearing gas through said discharge gap region;

iv) A structure of electrically conductive material having a plurality of spaced apart contact points from each of which inclines away a portion of said conductive material, said structure acting as a second electrode and positioned within said gas flow so that said plurality of contact points of said structure contact a surface of said dielectric material, to divide it up into a plurality of areas defined by zero potential nodes at the contact points said inclined portion providing a variable discharge gap with said dielectric material in between said points of contact;

v) Said first and second electrodes being adapted in use to be connected with a high frequency (as herein defined) electrical supply in producing ozone.

Further aspects of this invention which should be considered in all its novel aspects will become apparent from the following description given by way of example of possible embodiments thereof and in which reference is made to the accompanying drawings.

DESCRIPTION OF PREFERRED EMBODIMENTS

Figure 1:
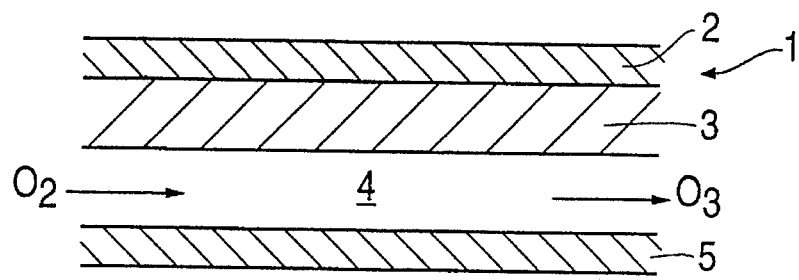
FIG. 1: Shows very diagrammatically a "prior art" corona cell.

Referring to FIG. 1 a "prior art" corona cell has a pair of metallic electrodes 2 and 5 which will have an A.C. voltage applied across them, typically of the order of 5 KV or greater. Separating the electrodes 2, 5 are a dielectric material 3 and a discharge gap region 4 through which oxygen or an oxygen bearing gas, identified by the arrow as $O_2$ is caused to flow resulting in the production of ozone indicated by the arrow $O_3$. The dielectric 3 and the discharge gap region 4 can be considered as a pair of series capacitors which, when the corona is developed in the air gap, become a capacitor (the dielectric) in series with a "soft" regulator device such as a neon tube as the voltage drop across the gap 4 tends towards a constant value at the onset of corona. When a corona is present ozone will be produced if oxygen is present in the discharge gap region 4. In a practical minimum gap, say of the order of 2 mm, if the gas in the gap region 4 was air at STP, the voltage across the gap region 4 would typically be around 6 KV peak for the discharge to start. The potential then existing between the electrodes 1 and 5 would be dependent on the thickness and type of dielectric material 3. If this was 0.5 mm mica the potential across electrodes 1 and 5 would typically be around 8 KV peak for the discharge to start.

As mentioned previously the typical frequency range used in such a conventional corona cell I would be between 50 Hz and 2 KHz.

Figure 2:
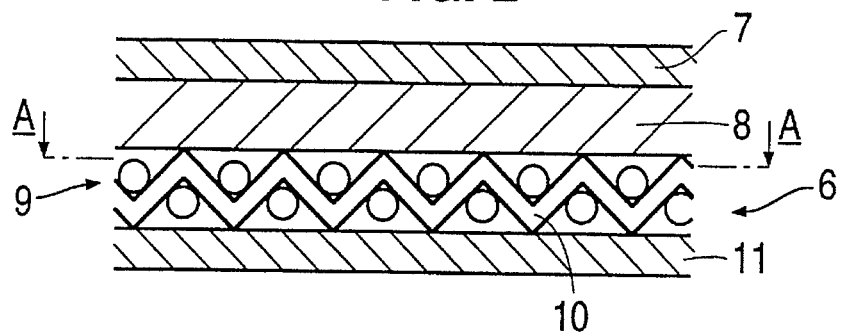
FIG. 2: Shows very diagrammatically a corona cell according to one possible embodiment of the invention.
Figure 3:
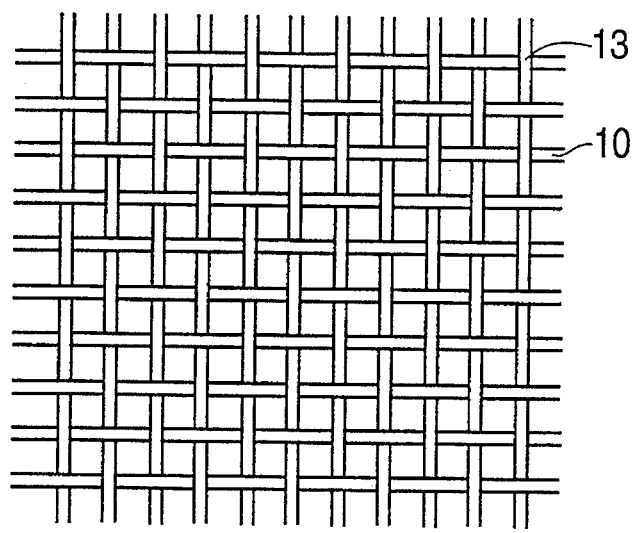
FIG. 3: Shows a view along arrows A—A of FIG. 2.

Referring now to FIGS. 2 and 3 of the accompanying drawings, a corona cell according to one possible embodiment of the invention is shown very diagrammatically and referenced generally by arrow 6.

Again it is shown having a pair of electrodes 7 and 11 separated by a dielectric 8 and a discharge gap region 9 through which oxygen or oxygen bearing gas will be caused to flow so that, with the corona present in the air gap 9, ozone will be created.

However it is seen that positioned within the discharge gap region 9 in the present invention of this particular embodiment is a mesh 10 of an electrically conductive material such as titanium or stainless steel. In this embodiment, the mesh 10 is shown contacting both the dielectric 8 and the electrode 11 so that the mesh 10 effectively forms part of the electrode 11.

In FIG. 3 a plan view of the mesh 10 shows it provided by way of example only as a grid pattern which could, by way of example only, have in one particular size of cell 6, perhaps 8×8 squares per square inch but of course any shapes, configurations and/or sizes of mesh 10 of any suitable material could be used. The mesh 10 at the points where the wires or the like cross over will provide a regular pattern of a plurality of contact points 13 with the dielectric 8, with corresponding contact points or "nodes" being provided along the under surface of the mesh 10 contacting the electrode 11.

A variable discharge gap is therefore created between the mesh 10 and the dielectric 8 due to the mesh wire angling away from each contact point. It has been found that with the placement of the mesh 10 An the discharge gap region 9, the discharge now commences at around 1.5 KV peak thus representing a substantial reduction in the voltage required. While the introduction of the mesh 10 has increased the capacitance of the cell 6 possibly by a factor of two, the decrease in voltage achieved is by a factor greater than four so that there is an advantage of two to one with respect to the standard cell 1 such as shown in FIG. 1.

Moreover, with the introduction of the mesh 10 the frequency that can be used can be substantially higher, suitably in the range 20 KHz to 30 KBz and even above 30 KHz. Compared with the standard "high" frequency of 2 KHz used in such cells to date, this increase in the frequency is clearly a major one.

The invention makes use of the fact that the surface of the dielectric 8 at its conjunction with the discharge gap region 9 defines what is often called "an equipotential plane", which occurs because of the division of the cell voltage between gaseous and solid dielectrics. As the individual elements of the "plane" are electrically insulated from one another, contact points 13 of the mesh 10 only remove the potential of that surface at the points where it actually touches, i.e. the "high" points of the mesh 10. The rest of the surface is left at high potential. Also, as the conductive wire or the like of the mesh 10 is angling away from each contact point 13 it is creating a variable gap starting from zero. This overcomes another disadvantage of a standard cell where the discharge tends to favour certain areas of the cell due to non-uniformity of the gap. The mesh 10 in the present invention is believed to overcome or cancel out such non-uniformity of the gap 9 thus avoiding or at least reducing localised heating due to localised discharge which can damage a cell.

By providing a regular pattern of contact points with the dielectric 8 a substantially uniform discharge can be achieved within the gap region 9.

Figure 11:
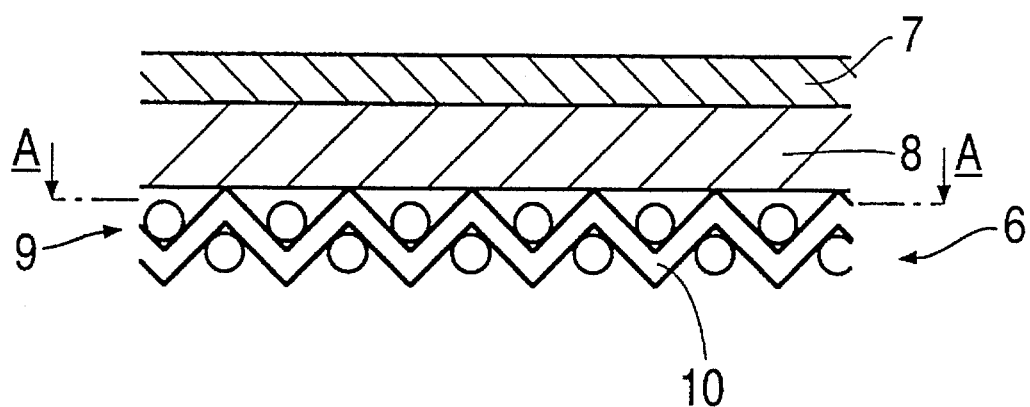
FIG. 11: Shows very diagrammatically a corona cell according to a still further possible embodiment of the invention.

It will be appreciated that the mesh 10 acts as the second electrode but is being held in position by the electrode 11. The electrode 11 therefore could be omitted and other support means provided for the mesh which could then be connected directly across the electric potential. This alternative embodiment with the electrode 11 omitted is shown in FIG. 11.

Figure 4:
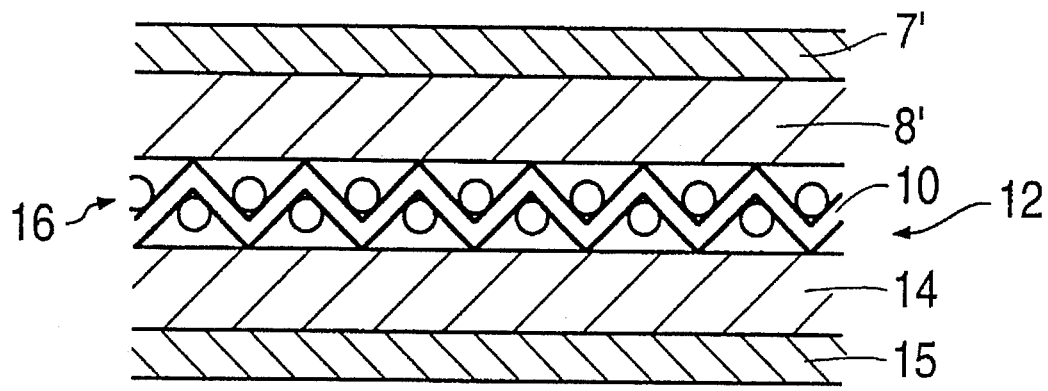
FIG. 4: Shows very diagrammatically a corona cell according to a further possible embodiment of the invention.

In a further alternative embodiment of the present invention as shown in FIG. 4, referred generally by arrow 12, the electrode 7 of FIG. 2 is now replaced by a pair of electrodes $7^1$ and 15 each associated with a respective dielectric $8^1$ and 14 with a discharge gap region 16 positioned between them Within which the mesh 10 is again acting as the second electrode.

The cell 12 of FIG. 4 again is able to achieve an improved ozone generation at a much lower voltage and a much higher frequency again due to the mesh 10 enhancing the ozone production characteristics of the discharge gap region 16.

Figure 5:
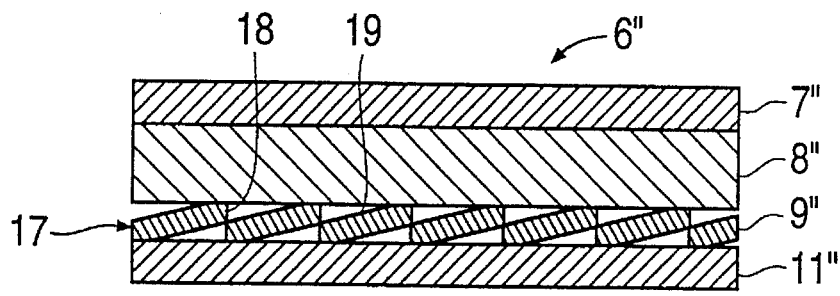
FIG. 5: Shows very diagrammatically a corona cell according to a further possible embodiment of the invention.
Figure 7:
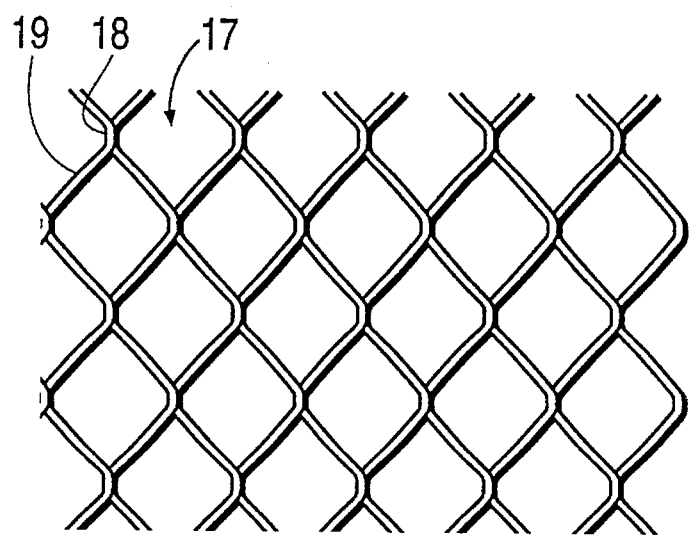
FIG. 7: Shows very diagrammatically an enlarged plan view of a mesh of electrically conductive material which can be used as the second electrode in the embodiments of FIGS. 5 and 6.

Referring now to FIG. 5 of the accompanying drawings, in a still further embodiment of the present invention, referred generally by arrow $6^{11}$, reference numerals corresponding to those used in the earlier embodiments being used where appropriate, separating the electrodes $7^{11}$ and $11^{11}$ are a solid dielectric material $8^{11}$ and a discharge gap region $9^{11}$ through which oxygen or oxygen bearing gas will be caused to flow. Within the discharge gap region $9^{11}$ is a structure 17 of an electrically conductive material, such as titanium or stainless steel for example, which is shown to contact the surface of the solid dielectric $8^{11}$ and the electrode $11^{11}$ so as to effectively form with it, the second electrode. As shown in FIG. 7, the electrically conductive structure 17 may comprise an expanded metal structure which in a cross sectional view, as shown in FIG. 5 has the loops 19 of electrically conductive material rising upwardly to contact the dielectric material $8^{11}$ at the apexes 18 so as to provide a regular pattern of a multiplicity of contact points with the dielectric $8^{11}$ and the sloping surface of the structure 17 providing a variable discharge gap in between the contact points.

Figure 6:
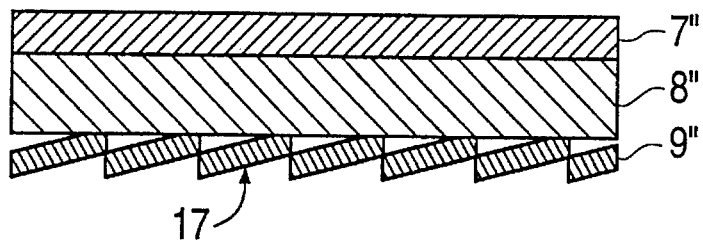
FIG. 6: Shows very diagrammatically a corona cell according to a still further possible embodiment of the invention.

In the alternative embodiment shown in FIG. 6, the electrode $11^{11}$ has been once again omitted so that the electrically conductive structure 17 is again then connected directly across the electric potential to form the second electrode by itself.

Figure 8:
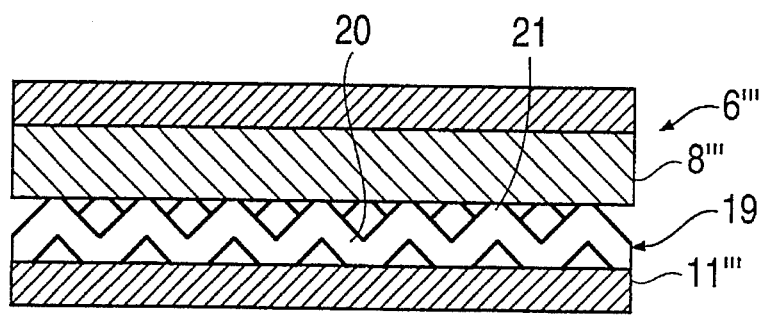
FIG. 8: Shows very diagrammatically a corona cell according to a still further possible embodiment of the invention.

Referring now to FIG. 8 of the accompanying drawings, a further embodiment of the present invention is referenced generally by arrow $6^{111}$. In this embodiment, a further electrode $11^{111}$ is shown provided whereas in the further alternative embodiment of FIG. 9, the further electrode is omitted so that the electrically conductive structure 19 then acts as the second electrode by itself.

Figure 9:
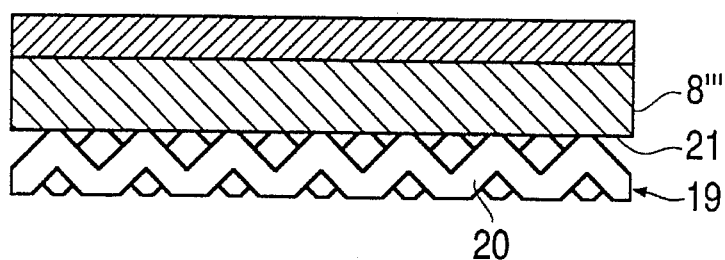
FIG. 9: Shows very diagrammatically a corona cell according to a still further embodiment of the invention.
Figure 10:
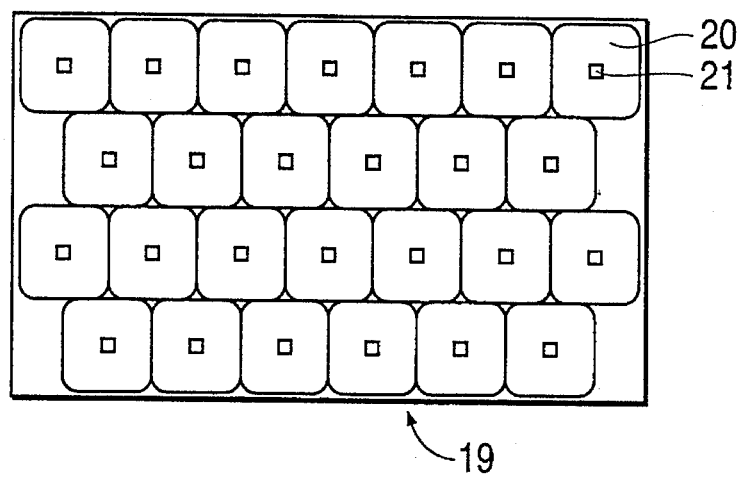
FIG. 10: Shows very diagrammatically an enlarged plan view of a second electrode which may be used in the embodiments of FIGS. 8 and 9.

As will be seen from the cross sectional views in FIGS. 8 and 9 and the plan view of FIG. 10, the structure 19 in this embodiment comprises a shaped or punched sheet of electrically conductive material such as titanium or stainless steel forming a plurality of pyramidal shapes 20, the apexes 21 of which providing the contact points for the structure 19 with the solid dielectric $8^{111}$. The sloping surfaces of the pyramidal shapes 20 provide a variable discharge gap in between the contact points. It is envisaged that the structure 19 could be formed by any suitable stamping, pressing, punching, casting, moulding or other suitable technique. The pyramidal shapes 20 are shown providing a substantially regular pattern so as to provide a correspondingly substantially regular pattern of contact points 21 with the solid dielectric $8^{111}$.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope of the invention as defined in the appended claims.

I claim:

1. A method of generating ozone using an electrical supply having a frequency of at least 20 KHz comprising:
   i) providing a first electrode, a solid dielectric material and a discharge gap region with said dielectric material provided between said first electrode and said discharge gap region;
   ii) providing, in use, a flow of oxygen gas or oxygen bearing gas through said discharge gap region;
   iii) providing a structure of electrically conductive material having a plurality of spaced apart contact points from each of which is inclined away a portion of said conductive material;
   iv) positioning said structure to act as a second electrode within said gas flow so that said plurality of contact points of said structure contact a surface of said dielectric material to divide it up into a plurality of areas defined by zero potential nodes at said second contact points and each said inclined portion provides a variable discharge gap with said dielectric material in between said points of contact; and
   v) connecting an electrical supply at a frequency of at least 20 KHz across said first and second electrodes.

2. A method of generating ozone as claimed in claim 1 including connecting said electrically conductive material directly across said high frequency supply.

3. A method a claimed in claim 1 wherein said points of contact are provided as a regular pattern.

4. An ozone generating apparatus which operates at a frequency of at least 20 KHz comprising:
   i) a first electrode;
   ii) a solid dielectric material and a discharge gap region with said dielectric material provided between said first electrode and said discharge gap region;
   iii) supply means, in use, to provide a flow of oxygen gas or oxygen bearing gas through said discharge gap region;
   iv) a structure of electrically conductive material having a plurality of spaced apart contact points from each of which inclines away a portion of said conductive material said structure acting as a second electrode and positioned within said gas flow so that said plurality of contact points of said structure contact a surface of said dielectric material to divide it up into a plurality of areas defined by zero potential nodes at the contact points, each said inclined portion providing a variable discharge gap with said dielectric material in between said points of contact;
   v) said first and second electrodes being adapted in use to be connected with an electrical supply having a frequency of at least 20 KHz in producing ozone.

5. An ozone generating apparatus as claimed in claim 4 wherein said structure is connected directly to said electrical supply.

6. An ozone generating apparatus as claimed in claim 4 wherein a further electrode connects said structure to said electrical supply.

7. An ozone generating apparatus as claimed in claim 6 wherein said solid dielectric material is provided on both sides of said discharge gap region adjacent said first and said further electrode respectively.

8. An ozone generating apparatus as claimed in claim 4 wherein said structure is in the form of a mesh where said contact points are provided by the cross over of the wires of the mesh.

9. An ozone generating apparatus as claimed in claim 4 wherein said structure is an expanded metal structure with raised up portions thereof providing said contact points.

10. An ozone generating apparatus as claimed in claim 4 wherein said structure is in the form of a plate having a plurality of upraised portions providing said contact points.

11. An ozone generating apparatus as claimed in claim 10 wherein each of said upraised portions is in the form of a pyramidal shape with the apex portions thereof providing said contact points.

12. An ozone generating apparatus as claimed in claim 4 wherein said contact points define a regular pattern.

13. An ozone generating apparatus as claimed in claim 4, wherein said electrically conductive material is titanium.

14. An ozone generating apparatus as claimed in claim 4 wherein said electrically conductive material is stainless steel.

15. A method of generating ozone using an electrical supply comprising:
   i) providing a first electrode, a solid dielectric material and a discharge gap region with said dielectric material provided between said first electrode and said discharge gap region;

ii) providing, in use, a flow of oxygen gas or oxygen bearing gas through said discharge gap region;

iii) providing a structure of electrically conductive material having a plurality of spaced apart contact points from each of which is inclined away a portion of said conductive material;

iv) positioning said structure to act as a second electrode within said gas flow so that said plurality of contact points of said structure contact a surface of said dielectric material to divide it up into a plurality of areas defined by zero potential nodes at said second contact points and each said inclined portion provides a variable discharge gap with said dielectric material in between said points of contact; and v) connecting an electrical supply across said first and second electrodes.

16. A method of generating ozone as claimed in claim 15, wherein said contact points are provided as a regular pattern.

17. An ozone generating apparatus comprising:

i) a first electrode;

ii) a solid dielectric material and a discharge gap region with said dielectric material provided between said first electrode and said discharge gap region;

iii) supply means, in use, to provide a flow of oxygen gas or oxygen bearing gas through said discharge gap region;

iv) a structure of electrically conductive material having a plurality of spaced apart contact points from each of which inclines away a portion of said conductive material said structure acting as a second electrode and positioned within said gas flow so that said plurality of contact points of said structure contact a surface of said dielectric material to divide it up into a plurality of areas defined by zero potential nodes at the contact points, each said inclined portion providing a variable discharge gap with said dielectric material in between said points of contact;

v) said first and second electrodes being adapted in use to be connected with an electrical supply in producing ozone.

18. An ozone generating apparatus as claimed in claim 17, wherein said structure is in the form of a mesh where said contact points are provided cross over of wires of the mesh.

19. An ozone generating apparatus as claimed in claim 17, wherein said structure is an expanded metal structure with raised up portions thereof providing said contact points.

20. An ozone generating apparatus as claimed in claim 17, wherein said contact points define a regular pattern.

* * * * *